United States Patent
Babbage

(10) Patent No.: US 10,542,427 B2
(45) Date of Patent: Jan. 21, 2020

(54) MITIGATION OF PROBLEMS ARISING FROM SIM KEY LEAKAGE

(71) Applicant: VODAFONE IP LICENSING LIMITED, Newbury, Berkshire (GB)

(72) Inventor: Stephen H. Babbage, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 129 days.

(21) Appl. No.: 15/565,491

(22) PCT Filed: Apr. 8, 2016

(86) PCT No.: PCT/GB2016/050992
§ 371 (c)(1),
(2) Date: Oct. 10, 2017

(87) PCT Pub. No.: WO2016/162690
PCT Pub. Date: Oct. 13, 2016

(65) Prior Publication Data
US 2018/0084415 A1    Mar. 22, 2018

(30) Foreign Application Priority Data

Apr. 9, 2015   (GB) .................................. 1506045.2

(51) Int. Cl.
*H04L 29/06* (2006.01)
*H04W 12/04* (2009.01)
*H04L 9/08* (2006.01)

(52) U.S. Cl.
CPC ........... *H04W 12/04* (2013.01); *H04L 9/0841* (2013.01)

(58) Field of Classification Search
CPC ... H04L 9/0841; H04L 9/0827; H04L 9/0838; H04L 63/061; H04W 12/04
See application file for complete search history.

(56) References Cited

U.S. PATENT DOCUMENTS

| | | | | |
|---|---|---|---|---|
| 8,677,467 | B2 * | 3/2014 | Lincoln | G06F 21/12 |
| | | | | 726/5 |
| 2002/0076054 | A1 * | 6/2002 | Fukutomi | H04L 9/0844 |
| | | | | 380/277 |
| 2007/0143828 | A1 * | 6/2007 | Jeal | G06F 21/123 |
| | | | | 726/4 |
| 2008/0311956 | A1 * | 12/2008 | Taaghol | H04W 12/04 |
| | | | | 455/558 |
| 2009/0215431 | A1 * | 8/2009 | Koraichi | G06F 21/34 |
| | | | | 455/411 |

(Continued)

FOREIGN PATENT DOCUMENTS

| | | |
|---|---|---|
| EP | 2259539 A2 | 12/2010 |
| EP | 2704467 A1 | 3/2014 |

OTHER PUBLICATIONS

International Search Report and Written Opinion issued in PCT/GB2016/050992 dated Jun. 27, 2016.

*Primary Examiner* — Sher A Khan
(74) *Attorney, Agent, or Firm* — Workman Nydegger

(57) ABSTRACT

Method, system or Universal Integrated Circuit Card (UICC) for provisioning a UICC with a new key. The UICC contains an initial subscriber key shared between the UICC and an authentication center. A new key is exchanged between the UICC and the authentication center using a communication between the UICC and the authentication center authenticated using the initial subscriber key. The new key is used in place of the initial subscriber key for further communications with the UICC.

3 Claims, 2 Drawing Sheets

(56) References Cited

U.S. PATENT DOCUMENTS

| | | | | |
|---|---|---|---|---|
| 2009/0217036 | A1* | 8/2009 | Irwin | G06F 21/10 713/168 |
| 2010/0153721 | A1* | 6/2010 | Mellqvist | G06F 21/606 713/168 |
| 2010/0195833 | A1* | 8/2010 | Priestley | H04L 63/20 380/273 |
| 2010/0203864 | A1* | 8/2010 | Howard | H04W 8/18 455/411 |
| 2011/0243322 | A1* | 10/2011 | Pudney | H04L 63/0428 380/33 |
| 2011/0314287 | A1* | 12/2011 | Escott | H04L 63/061 713/171 |
| 2013/0101121 | A1* | 4/2013 | Nordholt | H04L 9/0852 380/279 |
| 2013/0103591 | A1* | 4/2013 | Wheeler | G06F 21/34 705/64 |
| 2013/0198838 | A1* | 8/2013 | Schmidt | H04L 9/3234 726/22 |
| 2013/0347064 | A1* | 12/2013 | Aissi | G06F 21/30 726/2 |
| 2014/0089669 | A1* | 3/2014 | Papillon | H04W 12/04 713/171 |
| 2014/0154979 | A1* | 6/2014 | Tomas | G06F 9/4403 455/41.1 |
| 2014/0179271 | A1* | 6/2014 | Guccione | G06F 21/10 455/410 |
| 2015/0220989 | A1* | 8/2015 | Hayes | G06Q 30/0261 705/14.35 |
| 2015/0365407 | A1* | 12/2015 | Jagana | H04L 67/10 726/29 |
| 2016/0006724 | A1* | 1/2016 | Vlot | H04L 63/0442 713/156 |

* cited by examiner

MITIGATION OF PROBLEMS ARISING FROM SIM KEY LEAKAGE

CROSS REFERENCE TO RELATED APPLICATIONS

This application is a U.S. Nationalization of PCT Application Number PCT/GB2016/050992, filed on Apr. 8, 2016, which claims priority to GB Patent Application No. 1506045.2 filed on Apr. 9, 2015, the entireties of which are incorporated herein by reference.

FIELD OF THE INVENTION

The present invention relates to a system and method for improving the security of UICC key provisioning, and in particular, provisioning SIM keys such as K and $K_i$.

BACKGROUND OF THE INVENTION

In a cellular or other network, a device may securely communicate with the network using a subscriber key, typically encoded within a secure environment of a UICC, SIM or embedded SIM, for example. The subscriber key (K or $K_i$) is shared with the network and typically stored within an operator core network. The subscriber key is usually burned in to a UICC at manufacture by a SIM vendor and is provided to the operator before the UICC is distributed to an end user or device.

In the case of machine-to-machine (M2M) devices, UICCs may be integrated into a device by a device manufacturer (OEM).

The UICC is also provided with a subscription identity and the combination of subscription identity and subscriber key (e.g. International Mobile Subscriber Identity (IMSI)/$K_i$) may be the UICC profile. It is this profile that enables a device having the UICC, to connect to and communicate with a mobile network.

Additional security may be required when passing any key material relating to specific UICC or SIM cards from the manufacturer (or personaliser) to other parties. Weaknesses in this process are highlighted by https://theintercept.com/2015/02/19/great-sim-heist/retrieved 7 Apr. 2016). There are other points at which the keys may leak, e.g. hacking into the SIM vendor; hacking into the mobile operator; an insider attack at the SIM vendor; or an insider attack at the mobile operator.

Even in the case of the remotely programmable embedded SIM, where the key is delivered Over The Air from a subscription manager rather than burned in at manufacture, there remain multiple points (at the subscription manager, at the mobile operator or in transit between the two) at which keys could leak.

Therefore, there are required a method, system and apparatus that overcomes these problems.

SUMMARY OF THE INVENTION

An subscriber key (or initial subscriber key) is shared between an authentication centre (AuC) and a Universal Integrated Circuit Card (UICC). This may be achieved using existing methods, such as adding the initial subscriber key at manufacture of the UICC or at a personalisation centre. The initial subscriber key for each UICC is sent securely to a mobile network operator or other distributor of the UICC, who can add the UICC profiles (UICC identifiers such as IMSI and the corresponding initial subscriber keys) to secure storage or a database within the AuC. This allows the UICC or device that holds the UICC, to communicate with the AuC. A connection is set up between the UICC and AuC using the subscriber key for authentication, encryption and/or validation. A key exchange or other security protocol takes place over this connection resulting in a new key shared between the UICC and the AuC. Exchanging material (e.g. different key material) may allow the new shared key to be derived by the UICC and the AuC without an actual transfer of the new key. This new key is then used instead of or replaces the subscriber key for further or future communications.

The AuC is a function, service or server that authenticates each UICC that attempts to connect to an operator core network. This usually occurs when a device having the UICC (e.g. a cell phone), is powered up. Once the authentication is successful, the home location register (HLR) is allowed to manage the UICC, which enables services to be provided. An encryption key is also generated that is subsequently used to encrypt all wireless communications (voice, data, SMS, etc.) between the mobile phone and the operator core network.

Direct and indirect authentication is based on K or $K_i$, which is a secret shared between the AuC and the UICC. $K_i$ is not directly transmitted between the AuC and the UICC but is used with the IMSI within a challenge and response process.

In accordance with a first aspect there is provided a method for provisioning a Universal Integrated Circuit Card, UICC, with a key, the UICC containing an initial subscriber key shared between the UICC and an authentication centre, the method comprising the steps of:

exchanging a new key between the UICC and the authentication centre using a communication between the UICC and the authentication centre authenticated using the initial subscriber key; and using the new key in place of the initial subscriber key for further communications with the UICC. Therefore, should the initial subscriber key be compromised then it can be replaced with a new key. This can be repeated once, more than once, at intervals or whenever required, where each time the current key is used to authenticate the communication and then replaced with a new key.

Preferably, the new key may be exchanged between the UICC and the authentication centre using either a Diffie Hellman (DH) or an elliptic curve Diffie-Hellman, ECDH, key agreement protocol. Diffie-Hellman key exchange or other key exchange protocols may be used.

Advantageously, the new key may be derived from a function of both the initial subscriber key and an output of the key agreement protocol.

Optionally, the method may further comprise the step of replacing the initial subscriber key on the UICC with the new key. Alternatively, the new key may be used without replacing the subscriber key, which is kept as well or moved.

Preferably, the authentication centre may be near to or within an operator core network. Keeping the authentication centre within the core network reduces the risk of security compromises.

Optionally, the UICC may be an embedded UICC, eUICC or a subscriber identity module, SIM.

Optionally, the new key may be derived from the initial subscriber key. The new key may be derived from any other existing shared cryptographic material, generated by the UICC or by the authentication centre.

Advantageously, the new key may be derived from a function applied to the initial subscriber key and a Diffie-Hellman or an elliptic curve Diffie-Hellman, ECDH, session key.

Optionally, the method may further comprise the step of sharing the new key with a subscription manager. This allows the UICC or device holding the UICC to be provisioned with new key material or services.

Preferably, the method may further comprise the step of communicating between the UICC and the subscription manager with communications authenticated using the new key.

According to a second aspect there is provided a system for provisioning a Universal Integrated Circuit Card, UICC, with a key, the UICC containing an initial subscriber key shared between the UICC and an authentication centre, the system comprising:

an authentication centre containing the initial subscriber key; and one or more processors configured to execute steps to:

exchange a new key between the UICC and the authentication centre using a communication between the UICC and the authentication centre authenticated using the initial subscriber key, and use the new key in place of the initial subscriber key for further communications with the UICC.

Optionally, the UICC may be an embedded UICC, eUICC or a subscriber identity module, SIM.

Preferably, the authentication centre may be within an operator core network.

According to a third aspect there is provided a Universal Integrated Circuit Card, UICC, comprising:

a memory store configured to store an initial subscriber key shared between the UICC and an authentication centre; and a secure execution environment, SEE, configured to:

exchange a new key between the UICC and the authentication centre using a communication between the UICC and the authentication centre authenticated using the initial subscriber key, and use the new key in place of the initial subscriber key for further communications with the authentication centre.

The UICC may be a SIM, embedded SIM or UICC or other device.

Advantageously, the initial subscriber key is K (i.e. for use in 3G or 4G networks) or $K_i$ (i.e. for use in 2G networks).

Preferably, the memory store may be within the SEE and the SEE is further configured to replace the initial subscriber key in the memory store with the new key.

The methods described above may be implemented as a computer program comprising program instructions to operate a computer. The computer program may be stored on a computer-readable medium.

The computer system may include a processor such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX, Windows® or Linux, for example.

It should be noted that any feature described above may be used with any particular aspect or embodiment of the invention.

BRIEF DESCRIPTION OF THE FIGURES

The present invention may be put into practice in a number of ways and embodiments will now be described by way of example only and with reference to the accompanying drawings, in which.

It should be noted that the figures are illustrated for simplicity and are not necessarily drawn to scale. Like features are provided with the same reference numerals.

DETAILED DESCRIPTION OF THE PREFERRED EMBODIMENTS

Figure 1:
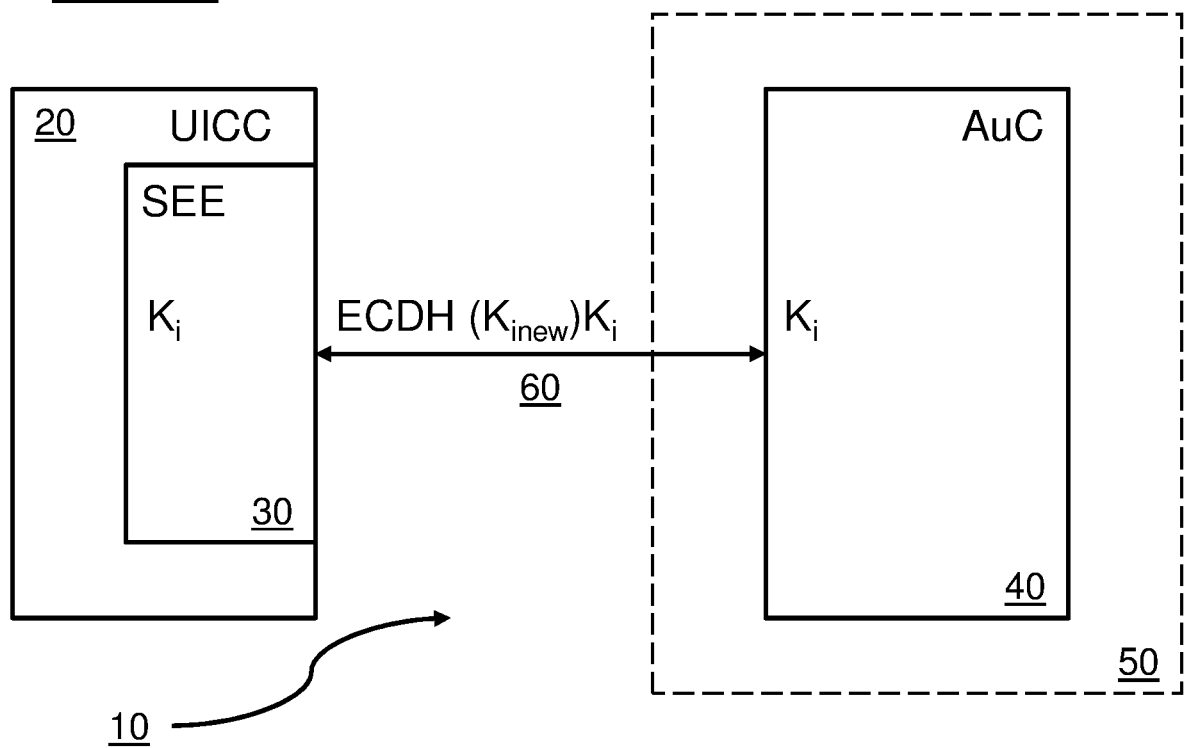
FIG. 1 shows a schematic diagram of a portion of a system for providing a UICC or device having the UICC with a new key.

One way to improve security in light of lost or stolen UICC subscriber keys is to improve protocols that are vulnerable to a single key loss or leak. The process of provisioning of credentials to a device (UICC or SIM) and the radio interface security architecture may each be improved. $K_i$ may be used to describe or refer to a long term secret key shared between a UICC (e.g. SIM) and an Authentication Centre (AuC). $K_i$ is the 2G term for this cryptographic material but it is simply referred to as K in 3G and 4G. Nevertheless, $K_i$ will be used throughout this disclosure but the techniques, methods and systems may be used with 3G, 4G, 5G and any future communication standard.

Remote provisioning may be used in a similar way to methods used to provision embedded SIMs. Such devices are usually described as eUICC (Embedded UICC), which refers to the part of an embedded SIM that is created in a factory (so typically hardware, operating system, initial keys, but excluding the IMSI and $K_i$ that may be delivered to it later).

Embedded UICC or SIM provisioning may operate according to the GSM standards. This may involve the eUICC being provisioned at manufacture with a permanent public key pair. When it's time to download a SIM profile (including IMSI and $K_i$):

A session key is agreed between the eUICC and a Subscription Manager (e.g. SM-DP). The SIM profile, including IMSI and $K_i$, is sent from the Subscription Manager to the eUICC, encrypted and signed using the session key.

Typically, three possibilities are supported for creating the session key:

(a) It can be created using a mutual key agreement protocol such as Elliptic Curve Diffie-Hellman (ECDH), with authentication of the exchanged messages to protect against man-in-the-middle attacks;

(b) or it can be generated by the eUICC and sent encrypted to the Subscription Manager;

(c) or it can be generated by the Subscription Manager and sent encrypted to the eUICC.

The IMSI/$K_i$ pair also needs to be transferred from the Subscription Manager to the Authentication Centre in a similar way as it is currently transferred from the UICC or SIM vendor to the Authentication Centre today.

An attacker may wish to obtain $K_i$ for one or more UICCs or eUICCs. Attacking a eUICC manufacturer is no longer sufficient. Should the UICC or eUICC private key be revealed or obtained (unlikely as there is no reason for this to leave the production system), and if the session key is exchanged using method (c), and if the attacker can intercept the provisioning messages in real time, and if the attacker can also break any other layers of transport security that may be protecting those messages, then they may be able to read the SIM profile in transit. This is a very challenging set of requirements for the attacker. Man-in-the-middle attacks are even harder as this requires the attacker to be a real-time man-in-the-middle if methods (a) or (b) are used to exchange the session key.

An easier approach is to target the sharing of $K_i$ between the subscription manager and the operator. This has a parallel with the NSA/GCHQ attacks reported https://theintercept.com/2015/02/19/great-sim-heist/. Keys may be attacked at generation or in storage at the subscription manager. This is also quite unlikely to be successful against a reputable subscription manager accredited according to Supplier Accreditation Scheme (SAS)-like standards being developed by GSMA and SIM Alliance. However, attacking keys in communication between the subscription manager and the operator appears to be the weakest point in the NSA/GCHQ attacks and it's likely to be the weakest again for embedded SIMs. This can be exacerbated if different operators require different communication methods as it may be difficult to ensure uniformly high security standards. Other attacks may target operator systems (e.g. HLRs exposed to the internet, subscriber admin systems exposed to the internet, $K_i$ records stored unencrypted).

This illustrates that embedded SIM use doesn't fundamentally change the threat model very much. The focus of attacks moves from the hardware manufacturer to the subscription manager, but otherwise the same main points of possible attack remain. Similar "weakest link" points may exist for embedded SIM as are evident for traditional SIMs but with potential attacks against the subscription manager instead of the UICC vendor.

More frequent updates of a device's $K_i$ may improve security. Traditional SIMs (e.g. within cell phones) have a single $K_i$ for life. Embedded SIMs may receive a new $K_i$ every month, for example, which may provide more work for hackers to keep up to date. However, this could be an unwelcome overhead, especially for M2M devices running for years on a single battery but may be feasible for consumer devices. However, this would create extra complexity. Therefore, operators may prefer approaches that give them greater assurance that the keys won't leak at all.

One drawback of the use of subscriber keys, with both traditional SIM manufacture and embedded SIM, is that they need to be shared between the entity that injects the keys into the UICC and the mobile operator's authentication centre (AuC). However, an improvement to security can be made by making these entities one and the same. This requires some further functionality within the AuC. In one implementation, an initial subscriber key $K_i$ is shared between authentication centre and the UICC using one of the existing methods. This is enough to allow the device to communicate. Using this connection or communication, a new key exchange takes place directly between the AuC and the UICC. Preferably, this takes the form of authenticated (Elliptic Curve) Diffie-Hellman key agreement, with the initial $K_i$ values used for authentication. However, other protocols may be used.

This creates a new shared key that now replaces the initial $K_i$, and is used as the $K_i$ from this point onwards. Even if the attacker had somehow obtained the initial $K_i$, it would still be very hard for them to obtain the new key ($K_{inew}$). The attacker would have to carry out an active man-in-the-middle attack at the time of the key exchange ($K_{inew}$). In fact, if the $K_{inew}$ value is derived directly from the Diffie-Hellman shared secret then a man-in-the-middle attack would result in the AuC and UICC ending up with different new keys ($K_{inew}$), which may be immediately detectable as mobile communication should not continue successfully. This mechanism for creating a new $K_i$ and replacing the previous one would not necessarily have to be integrated into the 3GPP standards, although standardisation could help with acceptance and adoption of the idea. Further protections may be put in place as the AuC may be exposed to external communication, at least partially.

Advantageously, this mechanism may also address some other concerns with embedded SIM use. In embedded SIM scenarios, operators may have to accept UICC hardware and IMSI/$K_i$ credentials from a much wider set of suppliers than before, with less confidence about their quality. Supplier accreditation schemes can give some reassurance here and if "profile interoperability" is finally achieved—allowing profiles from any subscription manager to work on any UICC hardware—then operators will be able to work with their favourite subscription managers irrespective of the UICC hardware manufacturer. However, the $K_i$ replacement mechanism described here gives another way to reduce risk. An operator may accept initial $K_i$'s from vendors that may not be entirely trusted but then replace those $K_i$'s with new ones created directly between the AuC and the UICC, thereby avoiding involvement from any subscription manager.

The mechanism described above involves a new $K_i$ value being derived using a key exchange protocol such as (Elliptic Curve) Diffie Hellman. One risk here is that a successful cryptographic attack on such a key exchange protocol will eventually develop; this could come about by advances in quantum computing, for example. In that case an attacker who does not know the original $K_i$ values, and so cannot carry out a "man in the middle" attack on the key exchange protocol, may still be able to derive the newly shared secret resulting from the protocol. An advantageous additional step, therefore, is that the new shared $K_i$ value to be used by the UICC and AuC is derived from both the output of the key exchange protocol and the original $K_i$ values. That way, an attacker would have to know the existing shared secret and compromise the key exchange to learn the newly derived secret.

FIG. 1 shows a schematic diagram of a portion of a system 10 for provisioning one or more keys to a UICC 20 such that the key ($K_i$) is shared between the UICC 20 and an authentication centre 40 within an operator core network 50. In this example, the UICC 20 contains a secure execution environment (SEE) 30 that can carry out secure processing, such as setting up secure communications with the authentication centre 40 and also storing an initial subscriber key, $K_i$.

In this example, the UICC 20 sets up an elliptic curve Diffie-Hellman (ECDH) key exchange protocol with the authentication centre 40. This ECDH key exchange protocol is illustrated by arrow 60 in FIG. 1. The ECDH communication between the UICC 30 and the authentication centre 40 is authenticated and protected by the initial subscriber key, $K_i$, which was previously shared or stored independently on the UICC 20 and the authentication centre 40.

The key being exchanged between the UICC 20 and the authentication centre 40 is a new subscriber key, $K_{inew}$. In the case of the ECDH protocol, a new shared secret is derived from data provided by both the UICC 20 and the authentication centre 40 as input to the protocol. This shared secret may be used directly as $K_{inew}$, or (preferably) $K_{inew}$ may be derived from the initial subscriber key $K_i$ and the ECDH shared secret.

Although this example uses ECDH key exchange, other protocols and secure communications may be used to exchange material necessary to enable both the UICC 20 and the authentication centre 40 to obtain or generate the new key, $K_{inew}$. In some alternatives to the ECDH protocol, $K_{inew}$ may be generated by the UICC 20 and sent to the authentication centre 40, or generated by the authentication centre 40 and sent to the UICC 20. This does not, however, provide the same cryptographic properties as a protocol like ECDH in which both participants provide input.

Figure 2:
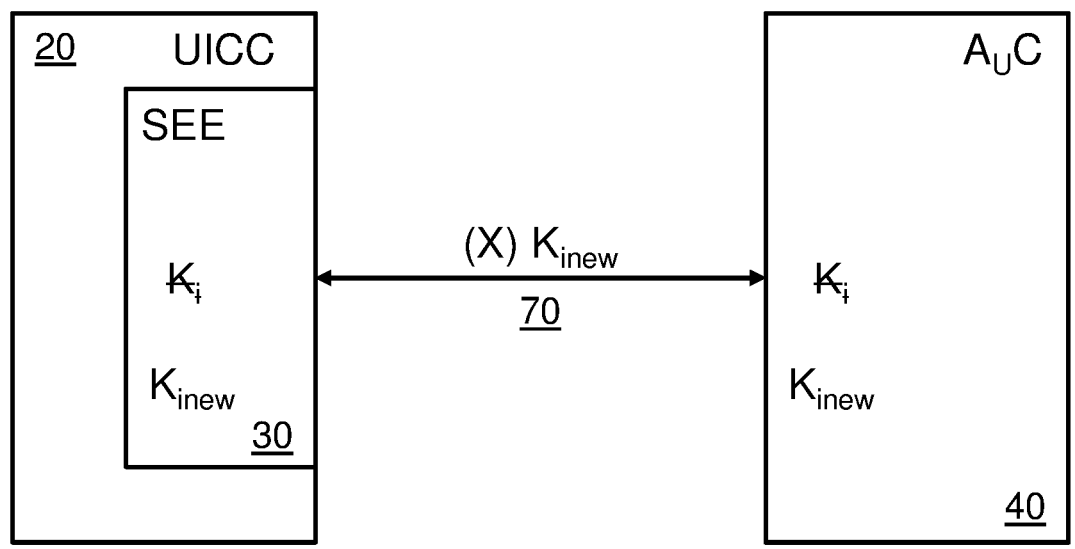
FIG. 2 shows a schematic diagram of a system of FIG. 1 illustrating the new key replacing an existing key.

Once the new key, $K_{inew}$, has been shared between the UICC 20 and the authentication centre 40 or generated from shared material, then it may be used for future communications either between the UICC 20 and authentication centre 40. FIG. 2 illustrates the initial subscription manager, $K_i$, being replaced within the SSE 30 or other memory store within the UICC 20, with $K_{inew}$. Similarly, the initial subscriber key, $K_i$, is replaced within storage of the authentication centre 40 with the $K_{inew}$. $K_{inew}$ may replace, overlap or simply be stored in addition to the initial subscriber key but used in its place. Further communications 70 between the UICC 20 and the authentication centre 40 are authenticated or otherwise protected using $K_{inew}$.

Figure 3:
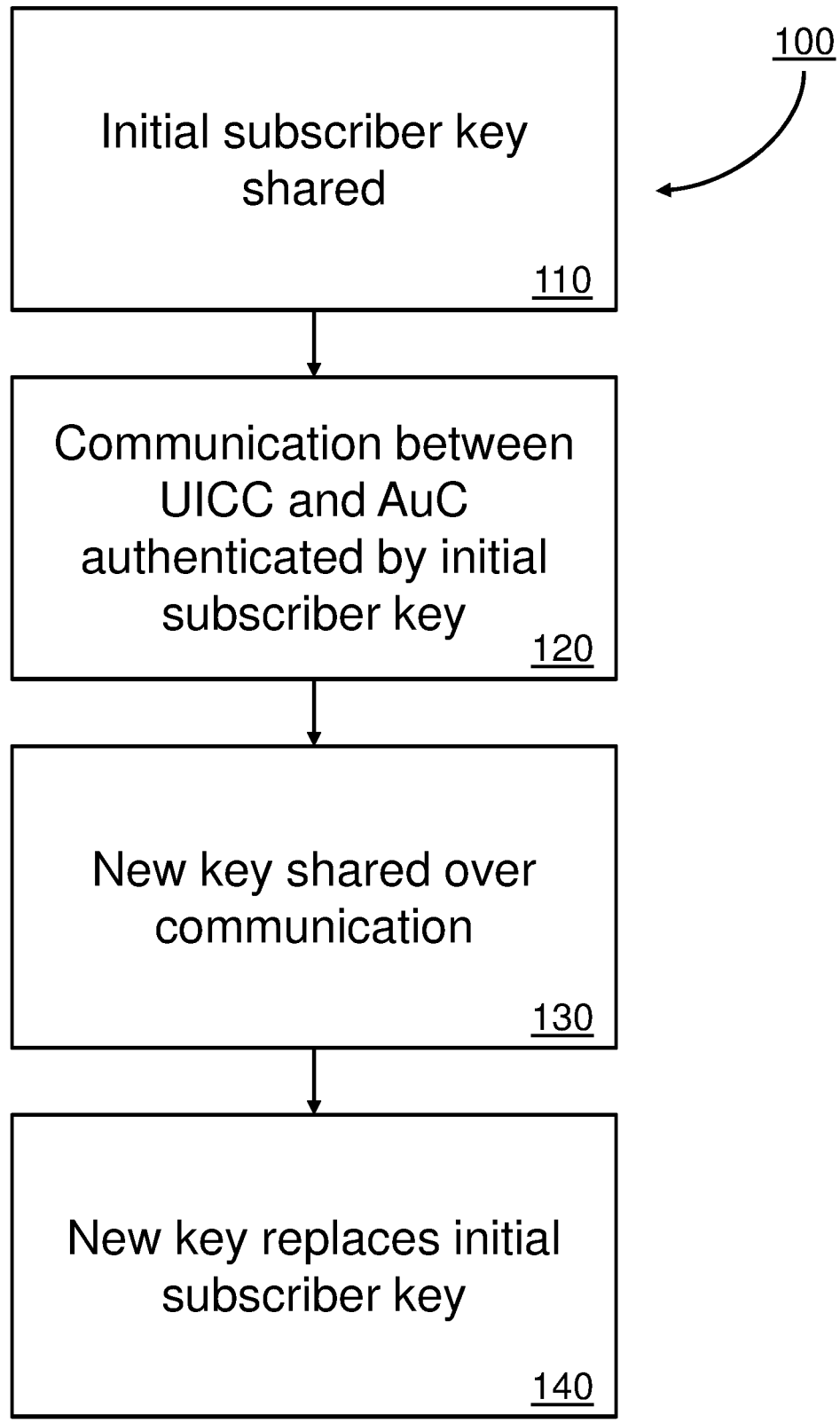
FIG. 3 shows a flowchart of a method for provisioning a UICC with a key.

FIG. 3 shows a flowchart of a method 100 executed by the system of FIG. 1, to replace the initial subscriber key with a new key. At step 110, the initial subscriber key, $K_i$, is either shared or provisioned to the UICC 20 and authentication centre 40. Communication between the UICC and authentication centre is setup at step 120. This communication is authenticated by the initial subscriber key, $K_i$. Once this authenticated communication is setup, then a new key is shared over the communication or otherwise obtained by both parties at step 130. The new key replaces the initial subscriber key at step 140. The new key ($K_{inew}$) is used for further communications with the UICC 20.

The logic or process used to carry out the method 100 may be carried out by the UICC 20, the authentication centre 40, the overall system 10 or a combination of any or all of these components or directed by another entity. The process may be initiated by the UICC 20 or by the authentication centre 40.

As will be appreciated by the skilled person, details of the above embodiment may be varied without departing from the scope of the present invention, as defined by the appended claims.

For example, the UICC may be a subscriber identity module (SIM), embedded SIM, eUICC or any other device having a secure execution environment (SEE). The SEE may store and/or execute instructions to carry out the method. The AuC 40 may be within, outside, or close to the core operator network 50.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

The invention claimed is:

1. A method for provisioning a Universal Integrated Circuit Card, UICC, with a new key, the UICC containing an initial subscriber key shared between the UICC and an authentication center, the method comprising the steps of:
   exchanging a new key between the UICC and the authentication center using a communication between the UICC and the authentication center authenticated using the initial subscriber key;
   using the new key in place of the initial subscriber key for further communications with the UICC by replacing the initial subscriber key in a memory store of the UICC with the new key, wherein the new key is exchanged between the UICC and the authentication center using either a Diffie Hellman (DH) or an elliptic curve Diffie-Hellman, ECDH, key agreement protocol, and further wherein the new key is derived from a function of both the initial subscriber key and an output of the key agreement protocol; and
   repeating the exchanging and using steps with the new key instead of the initial subscriber key to derive a further new key for further communications,
   wherein the authentication center is within an operator core network, and
   wherein the UICC is an embedded UICC, eUICC or a subscriber identity module, SIM.

2. A system for provisioning a Universal Integrated Circuit Card, UICC, with a new key, the UICC containing an initial subscriber key shared between the UICC and an authentication center, the system comprising:
   an UICC;
   an authentication center containing the initial subscriber key; and
   one or more processors configured to execute steps to:
   exchange a new key between the UICC and the authentication center using a communication between the UICC and the authentication center authenticated using the initial subscriber key;
   use the new key in place of the initial subscriber key for further communications with the UICC by replacing the initial subscriber key in a memory store of the UICC with the new key, wherein the new key is exchanged between the UICC and the authentication center using either a Diffie Hellman (DH) or an elliptic curve Diffie-Hellman, ECDH, key agreement protocol, and further wherein the new key is derived from a function of both the initial subscriber key and an output of the key agreement protocol; and
   repeating the exchanging and using steps with the new key instead of the initial subscriber key to derive a further new key for further communications,
   wherein the authentication center is within an operator core network, and
   wherein the UICC is an embedded UICC, eUICC or a subscriber identity module, SIM.

3. A Universal Integrated Circuit Card, UICC, comprising:
   a memory store configured to store an initial subscriber key shared between the UICC and an authentication center; and
   a secure execution environment, SEE, configured to:
   exchange a new key between the UICC and the authentication center using a communication between the UICC and the authentication center authenticated using the initial subscriber key,
   use the new key in place of the initial subscriber key for further communications with the authentication center, wherein the memory store is within the SEE and the SEE is further configured to replace the initial subscriber key in the memory store the new key, wherein the new key is exchanged between the UICC and the authentication center using either a Diffie Hellman (DH) or an elliptic curve Diffie-Hellman, ECDH, key agreement protocol, and further wherein the new key is derived from a function of both the initial subscriber key and an output of the key agreement protocol, and repeating the exchanging and using steps with the new key instead of the initial subscriber key to derive a further new key for further communications, wherein the authentication center is within an operator core network, and wherein the UICC is an embedded UICC, eUICC or a subscriber identity module, SIM.

\* \* \* \* \*